Dec. 18, 1962 J. L. SWEENEY 3,069,678
ELECTRONIC SELECTION MEANS
Filed Dec. 30, 1957 2 Sheets-Sheet 1
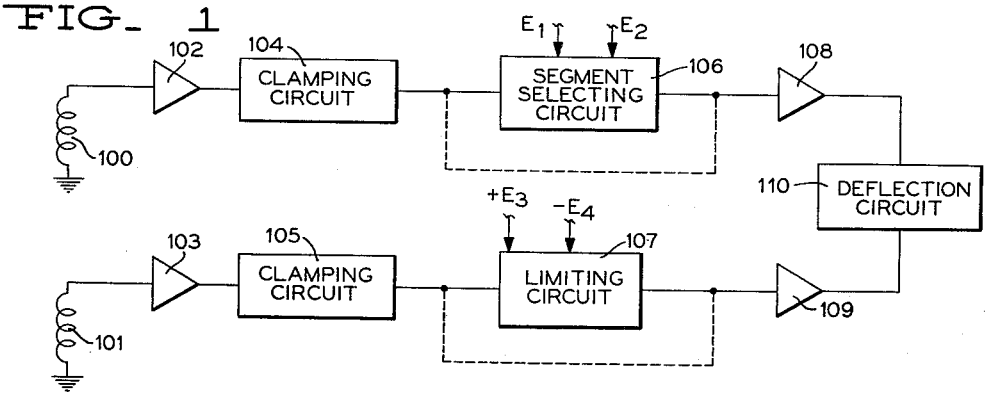
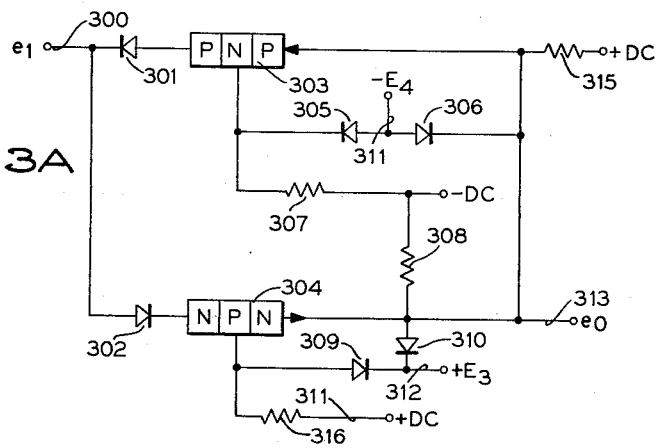
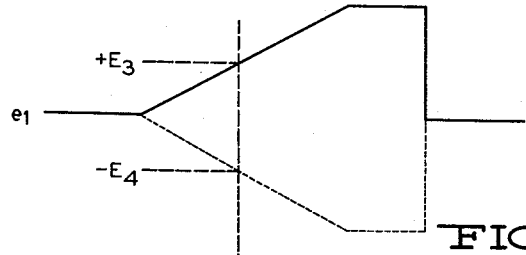
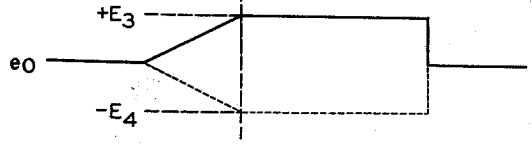
INVENTOR
JOHN L. SWEENEY
BY
Ralph R Barnard
ATTORNEY Dec. 18, 1962   J. L. SWEENEY   3,069,678
ELECTRONIC SELECTION MEANS
Filed Dec. 30, 1957   2 Sheets-Sheet 2

United States Patent Office 3,069,678
Patented Dec. 18, 1962

3,069,678
ELECTRONIC SELECTION MEANS
John L. Sweeney, Johnson City, N.Y., assignor to International Business Machines Corporation, New York, N.Y., a corporation of New York
Filed Dec. 30, 1957, Ser. No. 705,868
10 Claims. (Cl. 343—11)

This invention relates to improvements in electrical pulse type circuitry and more particularly to a new and improved electronic waveform segment selector.

In the electronic computer telemetering, radar and television art, it is often desired to select a particular segment which is of interest from the waveform of a signal under investigation. By way of a concrete example, the cathode ray tube display for radar systems utilizes sawtooth voltages in the generation of displays commensurate with range and bearing (or equivalent quantities) from a reference point in a manner that either an entire saw-tooth waveform or a portion thereof may be used in alternate modes of operation. More specifically, one type of radar presentation is known as a Plan Position Indicator (PPI) wherein an electron beam emanating within a cathode ray tube is successively swept radially outward from a predetermined point on the cathode ray tube screen while the direction of each successive beam sweep is being rotated through a complete circle or scanning back and forth through a sector thereof. Briefly, this is often provided by utilizing the output voltage of a saw-tooth voltage generator calibrated in accordance with the particular range being presented to energize the stator winding of a conventional electromechanical resolver. The rotor of this resolver is positioned in accordance with the instantaneous bearing of the antenna of the radar such that the two resolver windings carried on the rotor have voltages induced in each which are 90 electrical degrees apart and commensurate with the instantaneous search sweep of the radar in both range and bearing orientation, respectively.

One of these rotor windings is used to energize the vertical sweep circuits of the PPI and is known as the vertical resolver winding, while the other is used to energize the horizontal sweep circuits of the PPI and is known as the horizontal resolver winding. Conventionally, the output of the vertical resolver winding is then sent through an isolation stage to a clamping circuit which functions to assure that the saw-tooth voltage passing therethrough always commences at a desired reference voltage level corresponding to the predetermined reference point on the face of the cathode ray tube. The output of the clamping stage is then amplified and applied to the cathode ray tube vertical deflection means comprising either the vertical portions of an electromagnetic deflection yoke or vertical electrostatic deflection plates. Likewise, the output voltage from the horizontal resolver winding is fed through an isolation stage, a clamping stage and an amplification stage to the horizontal portions of the electromagnetic deflection yoke or horizontal electrostatic deflection plates. Because of the trigonometric relationship between the voltages induced in the vertical and horizontal resolver windings, the sweep voltage applied to the cathode ray tube from the vertical resolver winding is commensurate with the range search while the voltage appearing at the output of the horizontal resolver winding is commensurate with the bearing search of the antenna. The conventional radar PPI presentation is often referred to as a search mode of operation.

This completely conventional PPI presentation from a radar is satisfactory for many applications. However, there are instances when it is desired to take a portion of the radar presentation appearing on the face of the cathode ray tube and expand it to cover the entire face of the tube in a manner such that it appears that the start of the sweep of an electron beam across the face of a tube offset. This is often referred to as an "expanded" or "offset" presentation. In some instances, the apparent predetermined point at which the electron beam starts its sweep is off from the center of the PPI at a distance which is equal to seven times its radii. This mode of operation is often used when radar presentation is being utilized for the tracking of navigational reference points and bombing targets.

One of the prior art methods for accomplishing this expanded or offset presentation has been to calibrate the linear saw-tooth in accordance with the increased ranges from the radar with which the offset presentation is concerned and to blank out the initial or other portions of the linear saw-tooth voltage sweep appearing in the vertical and horizontal sweep circuit channels described above which will not appear on the cathode ray tube screen during the offset or expanded area operation. This technique has been generally unsatisfactory by reason of the fact that the blanking circuits provide considerable equipment complication and serious inaccuracies resulting from the failure to maintain the beginning of the partially blanked out saw-tooth at the particular reference point desired.

Another technique of the prior art has been to select a portion of the output voltage waveform from the clamping circuits in both the vertical and horizontal channels by the utilization of switching means known as the shunt type segment selector comprising two diodes, each biased to conduction when the instantaneous magnitude of the voltage waveform reaches the voltage commensurate with one boundary of the segment which is to be selected. In the prior art, such a selector switch has been inserted following the clamping circuit functionally described above in each of the channels and when the output voltage of the clamp reached that design magnitude (boundary) which would cause one of the diodes to conduct, the output of the clamping circuit was maintained at the boundary magnitude. This would have been satisfactory except for the fact that the clamping circuit was loaded down by the low impedance path to ground offered by the conducting diode. As is well known, the conventional clamping circuit is a low impedance low power source. Thus the limiting segment selecting action of the prior art materially decreased the power that is available to the deflection sweep circuit output of that channel. While this deficiency may be tolerated in vacuum tube circuitry, it raises serious design problems when transistors are utilized in the sweep circuit radar presentation circuitry. As is well known, transistors are current devices requiring substantial power in each stage of a system whereas vacuum tubes, being voltage devices, are not critically concerned with the need for power except in high output power stages. By way of example, vacuum tube circuits concerned with segment selection in the sweep circuitry of a radar PPI presentation often used a D.C. amplifier following the clamping circuit to obtain high power output in order that the shunt type segment selector input (the diode limit circuit briefly described above) with its high power attenuation might be used.

One technique being utilized to make the shunt type segment selector described above usable is to insert an impedance in the output of the clamping circuit prior to the segment selection. This has the deleterious effect of resulting in undesired waveform attenuation in the selector and giving the selected segment of the saw-tooth a steady state component.

In summary, the prior art techniques delineated hereinabove have the undesired effect of not presenting the low power clamping circuit with a high impedance at all times except during the actual segment selection time and failing to have a substantially constant unity gain (low attenuation) during segment selection time. In view of the shortcomings of the prior art, the present invention is concerned with providing a new and improved waveform segment selection means which excels in providing these characteristics with the added feature that it acts as a low impedance source to its load during the selection time. It is an important advantage that the teachings of the present invention are applicable to both positive going and negative going electrical waveforms independent of the shape of the waveform by reason of the fast rise times which may be handled. Moreover, as indicated hereinabove, the electronic waveform segment selector is particularly useful in transistorized vertical and horizontal sweep circuits used for expanded or offset presentation of a PPI.

It is, therefore, a primary object of the present invention to provide a new and improved electrical waveform selector means.

It is another object of the present invention to provide a new and improved means for electronically selecting those portions of a radar presentation which it is desired to present as an expanded presentation on a Plan Position Indicator.

It is an additional object of the present invention to provide a new and improved electrical waveform selector means which presents at a high impedance to its source at all times except during the actual segment selection time.

It is still another object of the present invention to provide a new and improved electrical waveform selecting means which will act as a low impedance source to its load during the waveform segment selection time.

It is another object of the present invention to provide new and improved electrical waveform segment selecting means providing a linear gain of substantially unity during the waveform selection time.

It is an additional object of the present invention to provide a new and improved electrical waveform segment selecting means which has a high frequency response during the waveform segment selection time.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a block diagram showing an exemplary Plan Position Indicator deflection circuitry incorporating the eelctronic waveform segment selector means of the present invention;

FIG. 3A is a detailed circuit diagram of a modification of the electronic segment selector shown in FIG. 2B according to the present invention so as to provide bipolar voltage limiting action; and FIG. 3B is a graphic plot of waveforms helpful in understanding the operation of FIG. 3A.

Figure 2D:
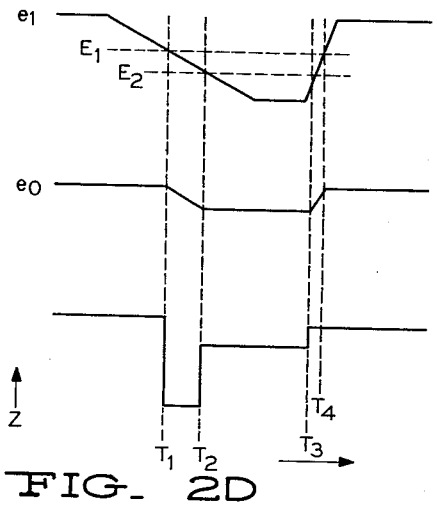
FIG. 2D is a graphic waveform plot which will be helpful in understanding the operation of the electronic waveform segment selector of the present invention.

Briefly stated the electronic switch for selecting a segment of a voltage waveform according to the present invention comprises electronic switching means responsive to an input voltage waveform, a portion of which is to be selected between first and second control voltages also fed thereto. Specifically, when the input voltage waveform source varies in magnitude between the first and second control voltages the portion therebetween is selected as a segment and transmitted to the output load of the electronic switch. Except during the actual segment selection time, the switch exhibits a high impedance to the input voltage waveform source so that the source is not loaded down. Further, the electronic switch of the present invention has only a small effect on the waveform segment selected and, therefore, can be considered to have almost a unity gain during the segment selection time. Moreover, the electronic switch acts as a low impedance source to its output during the segment selection time while maintaining a desirable frequency response such that it may handle large voltage rise times in the voltage waveform from which a segment is being selected. As already indicated, such an electronic segment selecting means has use in a wide range of technology such as the electronic computer, telemetering, radar and television arts and its utility is exemplified herein in its advantageous utilization for an improved offset or expanded presentation in a radar Plan Position Indicator display.

Referring to FIG. 1 there is shown by block diagram an exemplary Plan Position Indicator deflection circuitry in which the electronic waveform segment selector means of the present invention may be incorporated. Cathode ray tube radar displays, when utilized as Plan Position Indicators for radar targets may be generally considered to have two modes of operation. The first may be described as a searching mode where the radar presentation is displayed in polar co-ordinates from a reference point in the center of the cathode ray screen which corresponds to the location of the radar antenna. The display may be available utilizing several range scales all with the radar antenna corresponding to the center of the screen. The other display as indicated hereinabove has been referred to as the offset or expanded presentation mode of operation. Therein a selected small area of the search mode presentation is expanded to fill the entire face of the cathode ray screen. During this mode the origin of the sweeps (radar antenna) is offset from the center of the cathode ray screen and, therefore, is not presented to the viewer. It is during this latter offset mode of operation that the electronic waveform segment selector of the present invention is particularly useful.

In FIG. 1 it may be noted that both the segment selecting circuit 106 and the limiting circuit 107 are by-passed by dotted electronic information flow lines. During the search mode of operation both the electronic segment selector 106 and limiter 107 are by-passed, while during the offset or expanded mode of operation, the electronic segment selector 106 and limiter 107 act to determine the boundaries of that portion of the search mode PPI display which is expanded during the offset mode of operation. Vertical and horizontal resolver windings 100 and 101, respectively, are normally mounted on the rotor of a conventional co-ordinate resolver where the rotor is positioned in accordance with the radar antenna azimuth and voltages are induced in each of these windings which are 90 electrical degrees apart. Conventionally, the vertical resolver winding 100 has a voltage instantaneously induced therein which is commensurate with the range sweep voltage to be applied to the Plan Position Indicator, while amplifier 102 normally has a gain of approximately one and functions to isolate resolver winding 100 from the sweep circuits to be described hereinafter. The output from isolation amplifier 102 is then connected to a conventional clamping circuit 104, the purpose of which is to assure that the range sweep voltage always commences at the desired reference voltage level corresponding to the predetermined reference point on the face of the cathode ray tube during its search mode of operation. During this search mode, the output of clamping circuit 104 is fed directly to the deflection circuitry through amplifier 108. Conventionally, the deflection circuitry may comprise either an electromagnetic yoke or electrostatic deflection plates and either are represented by block 110.

Conventionally, horizontal resolver winding 101 has induced therein a voltage sweep waveform commensurate with the instantaneous bearing search of the Plan Position Indicator. Isolation amplifier 103 serves to isolate the electromechanical resolver from the horizontal deflection circuit, while, conventional clamping circuit 105 serves to provide a reference level corresponding to a reference bearing for the bearing saw-tooth voltage. As in the vertical deflection channel the output from clamping circuit 105 is fed directly to conventional amplifier 109 during the search mode by the dotted electronic flow path, by-passing limiter 107 as shown. The output from amplifier 109 is then fed to the deflection circuitry contained in block 110. Conventional switching means (not shown) may be used to switch the electronic segment selecting circuit 106 and limiting circuit 107 in and out of the circuit according to whether the expanded or searching mode of operation is desired.

As suggested above, when the vertical and horizontal deflection channels of a radar PPI presentation is transistorized it is important that the power level at each stage be maintained, since transistors are current devices requiring relatively substantial power in each stage as distinguished from vacuum tube circuits used in the same application. Thus, it is important that the electronic segment selector used in the vertical deflection channel and the limiter circuit used in the horizontal deflection channel be of a type which presents a high impedance to its input stage during other than the segment selection time and has a low attenuation therein during the segment selection time combined with a high frequency response to handle fast rise times in the voltage waveform. It is also desirable that the electronic switch act as a low impedance source to its load during the waveform selection time.

Figure 2A:
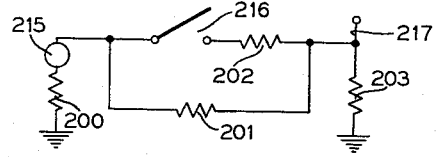
FIG. 2A shows a simplified mechanical switch analogy to the electric waveform segment selector of the present invention.

Referring to FIG. 2A there is shown a mechanical switch circuit arrangement which analogously provides many of the desirable characteristics of the purely electronic switch of the present invention. For example, the output voltage waveform of clamping circuit 104 of FIG. 1 may be represented by a signal source 215 and its low internal impedance 200, and may be shown as connected through mechanical switch 216 and resistor 202 to the output terminal 217. Further, output terminal 217 may be shown as connected to ground by resistor 203 representing the low impedance of the amplifier and deflection circuits described in FIG. 1. Resistor 202 may be shown as representative of the internal impedance of switch 216 when it is closed and resistor 201 may be shown connected in parallel with both switch 216 and resistor 200, thereby representing the open circuit impedance of switch 216. Resistance 201, representing the open circuit impedance of switch 216, is much greater than resistance 202 which represents the closed impedance of 216. If the clamping circuit voltage 215 has a particular waveform, a portion of which is to be selected by the action of switch 216, this switch may be arranged to close at the initial boundary of this segment and open at the other boundary of this segment which is later in time. Further, if the open switch impedance is much greater than the closed switch impedance, it may be seen that the switch action presents a high impedance during the time which switch 216 is open (other than segment selection time) and a low impedance during the time switch 216 is closed (segment selection time). Moreover, because resistor 202 represents a relatively low impedance of closed switch 216, this mechanical switch will act as a relatively low impedance source to its load impedance represented by resistor 203 during the waveform selection time. Because of the relative value of the internal impedance of switch 216 there will be relatively small attenuation during the waveform segment selection time resulting in the substantially unity gain. Also, as a result of the resistive nature of the closed switch, its time response will be sufficient to handle the voltage rise times which might be included in the segment of the voltage waveform which is selected by the time period with which switch 216 is closed.

Figure 2C:
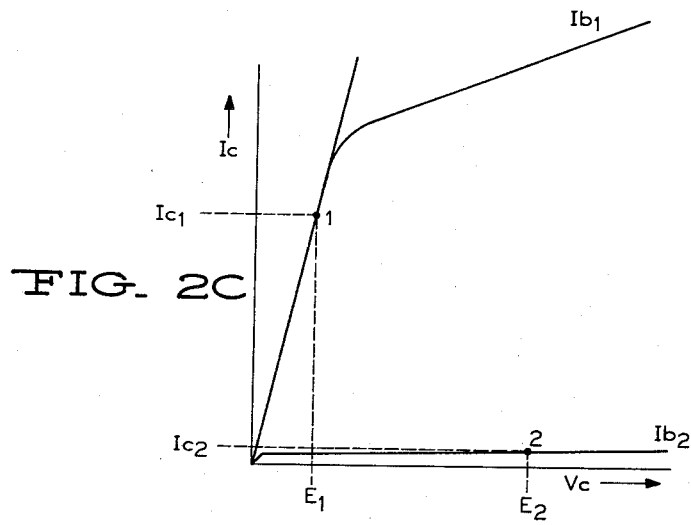
FIG. 2C is a graphic plot of the important electrical characteristics of the transistor used in the configuration shown in FIG. 2B which will be helpful in understanding the present invention.
Figure 2B:
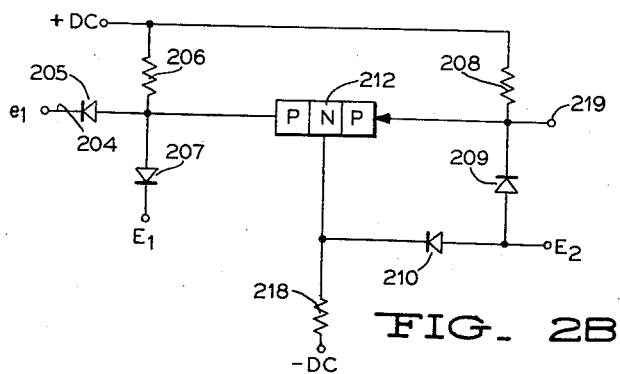
FIG. 2B shows the detailed circuitry of a preferred embodiment of an electronic waveform segment selector according to present invention.

While the mechanical switch shown in the circuit arrangement set forth in FIG. 2A has most of the desirable qualities and characteristics to provide a highly desirable waveform segment selection circuit, it should be obvious that this mechanical action of the switch requires much more time than is available in radar circuits dealing in microseconds. It is, therefore, the prime objective of the teachings of the present invention to provide means for selecting a desired segment of an electrical waveform in a manner which incorporates the highly desirable characteristics of the mechanical switch shown in FIG. 2A and which avoids the undesirable characteristics of the prior art set forth hereinabove. Such a means is shown in FIG. 2B comprising a PNP type of transistor 212 in a circuit configuration such that it is in a normally conducting state. Therein the collector is biased by a plus D.C. supply voltage through resistor 206 and the emitter (element with arrow) is biased by the same plus D.C. supply voltage through resistor 208. The base of transistor 212 is biased from a negative D.C. source through resistor 218.

It should be noted that throughout the description of the invention contained herein that the arrow on the diode in the drawing represents the plate of the diode. The input electrical waveform $e_i$, a portion of which is to be selected, may then be applied to the collector through a diode 205 with a polarity as shown. Further, a first control voltage $E_1$ commensurate with the magnitude of the first boundary of the segment of the waveform to be selected may be applied to the collector through a diode 207 with a polarity as shown. The emitter (element with arrow) is connected through diode 209 with a polarity as shown to the second control voltage $E_2$ which is commensurate with the voltage magnitude of the other boundary of the segment of the waveform being selected. This second control voltage $E_2$ is also connected to the base of the transistor through a diode 210 with a polarity as shown. The selected segment $e_0$ of the input voltage waveform $e_i$, appears on the emitter which is connected to output terminal 219. Although the teachings of the present invention are not limited thereto, the configuration of FIG. 2B is best suited to act as a segment selector for a negative going waveform.

As will be recognized by those skilled in the art, the circuit configuration shown in FIG. 2B for transistor 212 is not conventional inasmuch as neither the collector, base or emitter is directly connected to a fixed voltage level (i.e. grounded). During the switching action the transistor 212 has two operating conditions, one conducting and the other nonconducting. During the conduction condition the configuration shown results in the voltage being applied to the collector passing through the transistor to the emitter and output terminal 219 as an output voltage with substantially no attenuation represening a condition similar to the closed mechanical switch 216 in FIG. 2A. Moreover, when transistor 212 is in its nonconducting state, the configuration shown results in a high impedance between the input terminal 204 and output terminal 219 in a manner analogous to the open condition of mechanical switch 216 of FIG. 2A. FIG. 2C illustrates the operational characteristics of the transistor in the unconventional configuration shown in FIG. 2B.

In FIG. 2C there is shown the transistor characteristic representing the collector current versus the collector voltage for a relatively large base current condition $I_{b1}$ representing a conducting condition and a substantially low base current $I_{b2}$ representing a nonconducting condition. The assumption is made that during the conducting condition the transistor 212 is operated in a region of excess base current for the amount of collector current allowed to flow during the conducting or closed switch operation. This is often known as operating a transistor in its saturated region. By reason of this saturation, the base current remains quite constant as the collector voltage and collector current are varied. Moreover, during this condition the forward resistance of the transistor is small and not a function of the signal. The transistor, therefore, operates as an essentially linear circuit element with substantially no attenuation.

Referring to FIG. 2D there is shown voltage waveforms for the input voltage $e_1$, the output voltage $e_0$ and the impedance Z between the input and output terminals for the transistor circuit configuration shown in FIG. 2B. For purposes illustrating the operation of FIG. 2B, consider a time cycle of operation as being divided into time periods between times represented at $T_1$, $T_2$, $T_3$ and $T_4$. Consider that between times $T_4$ and $T_1$ that the negative going input voltage waveform being applied to input terminal 204 is less negative than the first control voltage. Further, consider that between times $T_1$ and $T_2$ the input voltage waveform varies in magnitude over the segment which it is desired to select between the boundaries represented by the first and second control voltage $E_1$ and $E_2$, respectively. Also consider that between times $T_2$ and $T_3$ the input voltage waveform exceeds or is more negative than the secondary boundary or control voltage $E_2$. In addition, consider that during times $T_3$ and $T_4$ the input voltage waveform being applied to terminal 204 is going positive with a magnitude between the second and first control voltages $E_2$ and $E_1$. Thus, during the time elapse between $T_4$ and $T_1$ the input voltage appearing at terminal 204 is more positive than the first control voltage $E_1$ and the collector of transistor 212 is maintained at the first control voltage by reason of the fact that diode 207 is conducting and operating as a closed switch while diode 205 is nonconducting with its inverse resistance acting as an open switch. Since transistor 212 is normally biased to its conduction state as set forth hereinabove, it acts as a closed switch and causes the emitter to approach the collector voltage which is, as described above, commensurate with the first control voltage. Since all the bias voltages for transistor 212 are correct, the first control voltage $E_1$ appears at the output as $e_0$. This condition is shown in FIG. 2D by the waveform commensurate with the output voltage $e_0$. Since the second control voltage is selected to be more negative than the first, and the output voltage $e_0$ is being maintained at the first control voltage $E_1$ level, diodes 210 and 209 are both biased to their nonconducting state and act as open switches. The output voltage $e_0$ is maintained at essentially the first reference voltage $E_1$ level until the input voltage $e_1$ reaches the magnitude of the first control voltage $E_1$. At that point in time, diode 205, being properly biased, commences to conduct and acts as a closed switch, while diode 207 is reversely biased and operates as an open switch, thereby allowing the collector voltage of transistor 212 to follow the input voltage $e_1$. Between time $T_1$ and time $T_2$, transistor 212 continues to remain in its conducting state with a substantially constant base current, thereby causing the voltage $e_0$ on output terminal 219 to follow the input voltage $e_1$. Reference should be made to the fact that $e_0$ is shown in FIG. 2D as following the input voltage $e_1$ during this period of operation.

At time $T_2$, however, the input voltage $e_1$ becomes substantially equal to the second control voltage $E_2$ and the base of transistor 212 becomes slightly more negative than the second control voltage such that diode 210 previously reversely biased now begins to conduct. Since diode 210 will now act as a closed switch, the base of the transistor is held at approximately the second control voltage. Likewise, the emitter of transistor 212 is maintained at a voltage commensurate with the second control voltage by reason of the fact that previously reversely biased diode 209 will tend to conduct if the output terminal goes more negative than the second control voltage, thereby maintaining the emitter and output terminal 219 at the second control voltage. Thus, the emitter and base of transistor 212 will be at substantially the same voltage level, slightly more negative than the second control voltage $E_2$. Inasmuch as proper positive biasing of the emitter to base junction is required to maintain the transistor 212 in its conducting condition, the transistor is then switched from its conducting condition represented by operating point 1 of FIG. 2C and a substantially constant large base current to its nonconducting state represented by operating point 2 of FIG. 2C resulting in a low base current $I_{b2}$ and low collector current $I_{c2}$. In this condition, the transistor 212 becomes an open switch and while the collector of the transistor may still follow the input voltage $e_1$, the transistor 212 will not transmit from the input terminal 204 to output terminal 219. During this time the voltage $e_0$ at output terminal 219 will be maintained almost equal to the second control voltage by the action of diode 209. The output voltage waveform $e_0$, shown in FIG. 2D, illustrates this action between times $T_2$ and $T_3$.

At time $T_3$, however, a positive going input voltage $e_1$ will rise such that it will become equal to the second control voltage $E_2$. The base of transistor 212 will become more positive than the second control voltage $E_2$, thereby opening diodes 210 and 209. Transistor 212 will be driven back into its conduction state from operating point 2 to operating point 1 of FIG. 2C, thereby allowing the output voltage $e_0$ on the emitter and output terminal 219 to follow the collector voltage which is equal to the input voltage $e_1$. FIG. 2D illustrates this increase of the output voltage $e_0$ between times $T_3$ and $T_4$. Applying reasoning similar to that set forth hereinabove, the emitter and output terminal 219 will follow the input voltage $e_1$ until it becomes equal to the first control voltage $E_1$ at time $T_4$. Following time $T_4$ output terminal 219 will again be held at the first control voltage $E_1$ level.

Referring again to FIG. 2D, there is shown additional waveforms illustrating the magnitude of the impedance Z existing between input terminal 204 and output terminal 219 of FIG. 2B during the above described time periods. From time $T_4$ to time $T_1$, representing the transistor in a conducting state with the input voltage $e_1$ being isolated by the reversely biased diode, the impedance between the input and output terminals is large and commensurate with the reverse impedance of diode 205. This condition is analogous to the open switch condition of mechanical switch of FIG. 2A. Further, between times $T_1$ and $T_2$ (representing the period when the transistor is conducting and diode 205 is acting as a closed switch), the impedance between the input and output terminals is very low as shown in FIG. 2D and is commensurate with the impedance of the transistor itself. This condition is analogous to the open switch condition of FIG. 2A. Moreover, during the period between times $T_2$ and $T_3$ the transistor 212 is switched to its nonconducting condition while diode 205 remains in its closed switch condition. During this period the impedance between input terminal 205 and output terminal 219 is equal to the nonconducting impedance of transistor 212 and is of a fairly large magnitude as shown in FIG. 2D. Between times $T_3$ and $T_4$ transistor 212 is again driven to conduction. However, the impedance between input terminal 204 and output terminal 219 will be at least as great as during the period between times $T_4$ and $T_1$ since diode 205 may open if the output voltage $e_0$ at output terminal 219 does not follow the input voltage $e_1$ at input terminal 204.

Thus, it may be seen from FIG. 2D that the electronic signal selecting means of the present invention satisfies the requirement set forth above. Reiterating it may be seen that the impedance between input terminal 204 and output terminal 209 is relatively high outside of the segment selection time $T_1$ to $T_2$. Further, since the output voltage $e_0$ is almost equal to the input voltage $e_1$ during the segment selection time $T_1$ to $T_2$ the requirement that the segment selector have a substantially unity gain during selection time is satisfied. In addition, it will be noted that the segment selector of the present invention acts as a low impedance source to its load (deflection circuits). In addition, as a result of the low impedance between the collector and emitter of transistor 212 during segment selection time, the segment selector will be able to provide the time response necessary to select waveforms with fast rise times.

When the segment selector is being applied to the vertical sweep channel of a Plan Position Indicator it is not desired to reproduce the positive going pulse between times $T_3$ and $T_4$. However, if this particular segment were important, care should be taken in the selection of the impedance of the load if it is desired that the collector of the transistor 212 follow the positive going input voltage $e_1$ without diode 205 opening. The D.C. supply voltages of FIG. 2B should be chosen to allow for conduction of the transistor over the complete D.C. control voltage selection range (selection of $E_1$ and $E_2$) with a relatively constant transistor base current. The magnitudes of resistors 208 and 218 should be chosen to assure sufficient base current during the "closed switch" time and yet maintain the high impedance requirement. Resistor 206 should be selected with the following considerations in mind: It must be of a magnitude to hold the collector of the transistor close to the first control voltage; it must be of a magnitude which is large with respect to the forward impedances of diodes 205 and 207; and it must be large enough to preserve the input impedance of the circuit.

Referring again to FIG. 2D, it is emphasized that while a waveform such as that shown for $e_1$ has been selected for illustration, this waveform might have any desired shape and could well have utilized a leading edge which is positive going rather than negative going in accordance with the particular circuit design. While the circuit shown is suited for negative going functions, it may be modified to operate equally well with positive going input voltage by reversing all the diodes and polarities including the substitution of an NPN type transistor for the PNP type utilized.

The electronic segment selector of FIG. 2B, as described above, provided means for selecting a segment from the negative going waveform between a first and second boundary represented by a first and second control voltage of the same polarity with all the desirable operating characteristics as set forth. Moreover, this segment selection means is a preferred segment selector for the range sweep channel of a PPI during the expanded presentation mode of operation by reason of these desirable operating characteristics. However, in the bearing sweep channel of a PPI during the expanded presentation operation it is necessary that the control voltages marking the boundaries of the segment be of opposite polarities with the need for desirable operating characteristics continuing. In FIG. 1 this circuit is referred to as limiting circuit 107.

In order to provide such a limiting circuit, the transistor circuitry of FIG. 2B may be modified so that the first boundary of the negative going waveform disappears and the second boundary of the negative going waveform is equal to the negative voltage limit. In FIG. 3A this function is performed by PNP transistor 303 which is biased at its emitter by a plus D.C. supply voltage through resistor 315 and at its base by a negative D.C. supply voltage through resistor 307 to a normally conducting condition. Diodes 305 and 306 are normally biased to an open switch position by the minus limiting voltage $-E_4$ until the input voltage $e_1$, being applied to the collector through steering diode 201, reaches a magnitude equal to $-E_4$. At this time the emitter and the base are maintained at a voltage approximately equal to $-E_4$ and the output voltage $e_0$ at the output terminal 313 is maintained at $-E_4$ as long as the input voltage exceeds (in the negative direction) the negative control voltage $-E_4$. Until the input voltage $e_1$ exceeds (in the negative direction) the negative control voltage $-E_4$ and the transistor 303 remains in its conductive stage, the impedance between input terminal 300 and output terminal 313 is low. However, when the input voltage $e_1$ exceeds the control voltage $-E_4$, the impedance between input terminal 300 and output terminal 313 is high commensurate with the impedance between the collector and emitter of the non-conducting transistor 303. It is emphasized that the biasing of transistor 303 to conduction and the driving of this transistor to its nonconducting condition is functionally identical with the operation of transistor 212 and its related circuitry in FIG. 2B near the upper boundary equal to the second control voltage.

Likewise, to provide the plus boundary for the positive going waveform in the limiting circuit each of the diodes of the negative going waveform portions are repeated reversed in polarity with transistor 303 repeated as an NPN type transistor 304 of similar operating characteristics. Transistor 304 is biased to its conducting condition by having a negative D.C. supply voltage applied to its emitter through resistor 308 and a plus D.C. supply voltage applied to its base through resistor 316. Control voltage $+E_3$ is connected to one common junction of diodes 309 and 310 in order that they are biased to their off switch position until such time that the input voltage $e_1$ reaches the plus control voltage $E_3$ and transistor 304 is driven to its nonconducting condition. The impedance between input terminal 300 and output terminal 313 varies in a manner similar to the path through transistor 303 for negative going waveforms. Diode 303 performs a steering function as does diode 301, each providing a high impedance for the path in which it is included when the input voltage is not of the polarity to cause that diode to act as a closed switch. FIG. 3B shows the voltage waveform for the input voltage $e_1$ and the output voltage $e_0$ of a bipolar limiting circuit such as that shown in FIG. 3A. It is emphasized that the bipolar limiting circuit has the same desirable operating characteristics as does the segment selector circuit of FIG. 2B.

Although the improved electronic waveform segment selector means of the present invention has been described herein as having a definite utility in providing the expanded or offset presentation in a PPI display, it is emphasized that it is equally applicable for selecting a portion of a voltage waveform in electronic computer, telemetering, and television applications whenever the desirable characteristics occurring thereto are of interest in those arts.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic switch comprising a transistor including collector, emitter and base portions, said transistor being biased in a normally conducting condition, a first, second, third and fourth diode, said collector being connected to an input terminal through said first diode and to a first control voltage source through said second diode, said emitter being connected to a second control voltage source through said third diode and an output terminal, said base being connected to said second control voltage through said fourth diode, an input voltage waveform applied to said input terminal being isolated from said collector by said first diode as long as said input voltage is less than said first control voltage, said input terminal being connected to said output terminal with substantially a unity gain as long as said input voltage exceeds said first control voltage and does not exceed said second reference voltage, said transistor going to a substantially non-conducting state when said input voltage exceeds said second control voltage and said output terminal being maintained substantially equal to said second control voltage by the action of said third diode when said input voltage exceeds said second control voltage.

2. A radar Plan Position Indicator with an expanded radar presentation comprising a linear saw-tooth source commensurate with the range sweep voltage of said radar, electronic clamping means responsive to said linear saw-tooth source providing a desired reference voltage level corresponding to the unexpanded reference point on the face of said Plan Position Indicator for said range sweep voltage, electronic segment selection means responsive to said electronic clamping means for selecting a segment of said range sweep voltage in accordance with the area of said radar range of said radar search of which it is desired to expand, deflection circuits responsive to said electronic segment selection means for providing the desired expanded Plan Position Indicator presentation, a first control voltage source input to said electronic segment selection means, a second control voltage source input to said electronic segment selection means, said electronic segment selection means acting to pass said range sweep voltage when its magnitude varies between said first and second control voltages thereby selecting a desired segment of said range sweep voltage in a manner such that said electronic segment selection means exhibits a high impedance to said range sweep voltage when not selecting a segment thereof and a low impedance to said range sweep voltage when selecting a segment thereof.

3. A radar Plan Position Indicator with an expanded radar presentation comprising a linear saw-tooth source commensurate with the bearing sweep of said radar, electronic clamping means responsive to said linear saw-tooth source providing a desired reference voltage level corresponding to the unexpanded reference point on the face of said Plan Position Indicator for said bearing sweep voltage, electronic limiting circuit means responsive to said electronic clamping means for selecting a segment of said bearing sweep voltage in accordance with the area of said radar search which it is desired to expand, deflection circuits responsive to said electronic limiting circuit means for providing the desired expanded Plan Position Indicator presentation, a first control voltage source input to said electronic limiting circuit means, a second control voltage source input to said electronic limiting circuit means, said electronic limiting circuit means acting to pass said bearing sweep voltage when its magnitude varies between said first and second control voltages selecting a desired segment of said bearing sweep voltage in a manner such that said electronic limiting circuit means exhibits a high impedance to said bearing sweep voltage when not selecting a segment thereof and a low impedance to said bearing sweep voltage when selecting a segment thereof.

4. A radar Plan Position Indicator with an expanded radar presentation comprising a first linear saw-tooth source commensurate with the range sweep voltage of said radar, electronic clamping means responsive to said first linear saw-tooth source providing a desired reference voltage level corresponding to the unexpanded reference point on the face of said Plan Position Indicator for said range sweep voltage, electronic segment selection means responsive to said electronic clamping means for selecting a segment of said range sweep voltage in accordance with the area of said radar range of said radar search of which it is desired to expand, a first control voltage source input to said electronic segment selection means, a second control voltage source input to said electronic segment selection means, said electronic segment selection means acting to pass said range sweep voltage when its magnitude varies between said first and second control voltages thereby selecting a desired segment of said range voltage sweep in a manner such that said electronic limiting circuit means exhibits a high impedance to said range voltage sweep when not selecting a segment thereof, a second linear saw-tooth source commensurate with the bearing search sweep of said radar, electronic clamping means responsive to said second linear saw-tooth source providing a desired reference voltage level corresponding to the reference bearing of said Plan Position Indicator, a third control voltage source, a fourth control voltage source, bipolar electronic circuit limiting means responsive to said second electronic clamping means and said third and fourth control voltages passing said bearing sweep voltage when its magnitude varies between said third and fourth control voltages selecting a desired segment of said bearing voltage sweep representing a bearing sector sweep of the desired expanded Plan Position Indicator presentation, said bipolar electronic limiting circuit means exhibiting a high impedance to said bearing sweep voltage when not selecting a segment of said bearing voltage sweep co-ordinate deflection circuits responsive to both said electronic segment selector and said bipolar limiting means for providing the desired expanded Plan Position Indicator presentation.

5. A radar Plan Position Indicator with an expanded radar presentation comprising a linear saw-tooth source commensurate with the bearing sweep voltage of said radar, electronic clamping means responsive to said linear saw-tooth source providing a desired reference voltage level corresponding to the unexpanded reference point on the face of said Plan Position Indicator for said bearing sweep voltage, bipolar electronic limiting circuit responsive to said electronic clamping means for selecting a segment of said bearing sweep voltage in accordance with the area of said radar search which it is desired to expand, deflection circuits responsive to said bipolar electronic limiting circuit means for providing the desired expanded Plan Position Indicator presentation, a positive control voltage source input to said bipolar electronic limiting circuit means, a negative control voltage source input to said bipolar electronic limiting circuit means, said bipolar electronic limiting circuit means acting to pass said bearing sweep voltage when its magnitude varies between said positive and negative control voltages thereby selecting a desired segment of said bearing sweep voltage in a manner such that said bipolar electronic limiting circuit means exhibits a high impedance to said bearing sweep voltage when not selecting a segment thereof, and said bipolar electronic limiting circuit means acting as a low impedance source to said deflection circuit when selecting said bearing sweep voltage segment.

6. An electronic switch comprising a first and second transistor each including collector, emitter, and base portions, said first transistor being of a PNP type being biased at its emitter and base to be in a normally conducting condition near base current saturation, said second transistor being of the NPN type and biased at its emitter and base to be in a normally conducting condition near base current saturation, a negative control voltage source, a positive control voltage source, a first diode biased open connecting the said base of first said transistor to a negative control voltage, a second diode biased open connecting a said emitter of said first transistor to said negative control voltage, a third diode biased open connected between said base of said second transistor to said positive control voltage, a fourth diode biased open connecting said emitter of said second transistor to said positive control voltage, an input terminal, an output terminal, a fifth diode, a sixth diode, said collector of said first transistor being connected to said input terminal through said fifth diode biased to pass negative going input voltage waveforms, said emitter of said first transistor being connected to said output terminal, said collector of said first transistor being connected to said input terminal through said sixth diode biased to pass positive input going voltage waveforms, said emitter of said second transistor being connected to said output terminal, said electronic means comprising a bipolar limiting circuit for passing both negative going and positive going pulses between said input and output terminals with a low impedance therebetween as long as each does not exceed said negative control voltage or said positive control voltage, said impedance between said input and output terminals being high for input voltages exceeding either said negative control voltage and said positive control voltage.

7. An electronic bipolar limiting means for selecting a segment of a voltage waveform comprising an input voltage source with either a positive or negative going waveform, a positive control voltage source, a negative control voltage source, a switching means responsive to said input voltage source and said positive and negative control voltages for transmitting said input voltage waveform when its magnitude varies between said positive and negative control voltages and acting as a high impedance thereto at all other times, said switching means comprising a first and second transistor each having a collector, emitter and base elements, said first transistor being of a PNP type, said second transistor being of an NPN type, a supply voltage source connected to said first and second transistors to normally back bias said collector base junction and forward bias said base emitter junction of each in a manner so that each of said transistors is normally in a saturated conducting condition, a first steering diode oriented to pass a negative going voltage waveform being connected between said source and the collector of said first transistor, a second steering diode oriented to pass a positive going voltage waveform being connected between said source and the collector of said second transistor, a first diode switching means responsive to said negative control voltage source connected in parallel with the base emitter junction of said first transistor, a second diode switching means responsive to said positive control voltage source connected in parallel with the base emitter junction of said second transistor, said first diode switching means acting to drive said first transistor to its non-conducting condition whenever the instantaneous magnitude of said input voltage waveform source exceeds the magnitude of said negative control voltage, said second diode switching means acting to drive said second transistor to its non-conducting condition whenever the instantaneous magnitude of said input voltage waveform source exceeds the magnitude of said positive control voltage, said switching means having a substantially unity gain and linear operation during the transmission of said input voltage waveform through either of said first and second transistors and exhibiting a high impedance thereto at all other times.

8. An electronic switch for selecting a segment of a voltage waveform comprising an input voltage waveform source, a transistor having a collector, emitter and base elements, a supply voltage source connected to normally back bias said collector base junction and forward bias said base emitter junction in a manner so that said transistor is normally in a saturated conducting condition, a first control voltage source, a second voltage source, a first diode switching means responsive to said first control voltage source, a second diode switching means responsive to said second control voltage source, said input voltage waveform being applied to said collector base junction through said first diode switching means, said second diode switching means being connected in parallel with said base emitter junction, said transistor exhibiting a high impedance to said input voltage waveform whenever the input voltage is less than the magnitude of said first control voltage or greater than said second control voltage.

9. An electronic switch for selecting a segment of a voltage waveform comprising an input voltage waveform source, a transistor having a collector, emitter and base elements, a supply voltage source connected to normally back bias said collector base junction and forward bias said base emitter junction in a manner so that said transistor is normally in a saturated conducting condition, a first control voltage source, a second voltage source, a first diode switching means responsive to said first control voltage source, a second diode switching means responsive to said second control voltage source, said input voltage waveform being applied to said collector base junction through said first diode switching means, said second diode switching means acting to drive said transistor to its nonconducting condition whenever the instantaneous magnitude of said input voltage waveform source exceeds the magnitude of said second control voltage, said second diode switching means being connected in parallel with said base emitter junction, said transistor exhibiting a high impedance to said input voltage waveform whenever the input voltage is less than the magnitude of said first control voltage or greater than said second control voltage.

10. An electronic switch for selecting a segment of a voltage waveform comprising an input voltage waveform source, a first control voltage source, a second control voltage source, switching means responsive to said input voltage waveform source and said first and second control voltages for transmitting said input voltage waveform source when its magnitude varies between said first and second control voltages, said switching means comprising a transistor having a collector emitter and base elements, a supply voltage source for normally back biasing said collector base junction and forwardly biasing said base emitter junction in a manner so that said transistor is normally in a saturated condition, a first diode switching means, a second diode switching means, said input voltage waveform being applied to said collector base junction through said first diode switching means, said second diode switching means being connected in parallel with said base emitter junction, said first and second control voltages being applied to said first and second diode switching means, respectively, in a manner so that a desired segment of said input voltage waveform appears in the emitter circuit of said transistor, said transistor exhibiting a high impedance to said input voltage waveform whenever its magnitude is not within the limits set by said first and second control voltages and exhibiting a substantially unity gain and linear operation at all other times.

References Cited in the file of this patent
UNITED STATES PATENTS

| | | |
|---|---|---|
| 2,802,179 | Labin et al. | Aug. 6, 1957 |
| 2,883,532 | Hyder | Apr. 21, 1959 |